(12) United States Patent
Srubar, III et al.

(10) Patent No.: US 8,507,588 B2
(45) Date of Patent: Aug. 13, 2013

(54) PHBV/GROUND BONE MEAL AND PUMICE POWDER ENGINEERED BIOBASED COMPOSITE MATERIALS FOR CONSTRUCTION

(75) Inventors: Wilfred V. Srubar, III, Stanford, CA (US); Sarah L. Billington, Palo Alto, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 0 days.

(21) Appl. No.: 13/367,900

(22) Filed: Feb. 7, 2012

(65) Prior Publication Data

US 2012/0202925 A1    Aug. 9, 2012

Related U.S. Application Data

(60) Provisional application No. 61/440,386, filed on Feb. 7, 2011.

(51) Int. Cl.
*C08L 89/04* (2006.01)

(52) U.S. Cl.
USPC ............................................. 524/10; 523/124

(58) Field of Classification Search
USPC ............................. 524/10, 493, 599; 523/124
See application file for complete search history.

(56) References Cited

U.S. PATENT DOCUMENTS

| 6,998,455 | B1 | 2/2006 | Ohta et al. | |
|---|---|---|---|---|
| RE39,339 | E | 10/2006 | Andersen et al. | |
| 7,579,176 | B2 | 8/2009 | Herrema et al. | |
| 2010/0093860 | A1 * | 4/2010 | Boon et al. | 514/557 |
| 2010/0190221 | A1 | 7/2010 | Herrema et al. | |
| 2010/0255540 | A2 | 10/2010 | Herrema et al. | |

FOREIGN PATENT DOCUMENTS

| WO | WO/00/31166 | 6/2000 |
|---|---|---|
| WO | WO/2007/024255 | 3/2007 |

OTHER PUBLICATIONS

Bernice M.Nzioki, Biodegradable Polymer Blends and Composites From Proteins Produced by Animal Co-Product Industry, Masters Thesis, Clemson University http://etd.lib.clemson.edu/documents/1285620642/Nzioki_clemson_0050M_10666.pdf; May 2010.

C.A. Fleischer et al., "Mechanical Performance of Pumice-reinforced Epoxy Composites," Journal of Composite Materials, Nov. 2010, vol. 44 No. 23, 2679-2696.

Jeng et al., "Meat and bone meal as nitrogen and phosphorus fertilizer to cereals and rye grass," Nutrient Cycling in Agroecosystems, vol. 76, Nos. 2-3, Nov. 2006 , pp. 183-191(9).

Wang et al., "Study of Moisture Absorption in Natural Fiber Plastic Composites," Composites Science and Technology, 66 (2005), pp. 379-386.

Reich et al., "Effect of Trabecular Bone Loss on Cortical Strain Rate During Impact in an in Vitro Model of Avian Femur," BioMedical Engineering OnLine, DOI: 10.1186/1475-925X-5-45 (2006), www.biomedical-engineering-online.com/content/5/1/45.

Sanger et al., "Bone Density and Ash Studies in Avian Osteopetrosis," Avian Diseases, vol. 26, No. 1 (1982), pp. 177-181.

* cited by examiner

*Primary Examiner* — Kriellion Sanders
(74) *Attorney, Agent, or Firm* — Lumen Patent Firm

(57) ABSTRACT

A composite material includes a matrix composed of a polyhydroxyalkanoate (PHA) polymer and a filler composed of particles dispersed in the matrix. The particles are composed of naturally-derived materials (e.g., ground bone meal or pumice powder), have a microporous microstructure, have a low hygroscopic expansion, and are less than 1.0 mm in size. Preferably, the matrix and the filler together constitute 100% by weight of the composite material, and at most 30% by volume of the composite material is consumed by the filler. The composite material may take the form of an anaerobically biodegradable article of manufacture such as a building material a coating of a building material or other article.

6 Claims, 1 Drawing Sheet

PHBV/GROUND BONE MEAL AND PUMICE POWDER ENGINEERED BIOBASED COMPOSITE MATERIALS FOR CONSTRUCTION

CROSS-REFERENCE TO RELATED APPLICATIONS

This application claims priority from U.S. Provisional Patent Application 61/440,386 filed Feb. 7, 2011, which is incorporated herein by reference.

STATEMENT OF GOVERNMENT SPONSORED SUPPORT

This invention was made with Government support under contract 07-T3451 awarded by California Environmental Protection Agency, and under contract 0900325 awarded by National Science Foundation. The Government has certain rights in this invention.

FIELD OF THE INVENTION

The present invention relates generally to plastic composite materials. More specifically, it relates to biodegradable composites made of a plastic matrix and a particulate filler.

BACKGROUND OF THE INVENTION

Plastic composite materials have been developed and used for various purposes. It remains a challenge, however, to develop bioplastic composite alternatives that would be suitable for structural building end use. For such applications a combination of features are desired, such as high strength and stiffness, low density, low cost, environmental durability, and biodegradability. A particular challenge for known bioplastic composites is that they are expensive to manufacture and generally lack sufficient durability when exposed to high humidity environments. Consequently, there is a need for composite materials that overcome these current limitations in the art. Given the vast number of possibilities for such composites and the complex and unresearched issues related to their structural properties, biodegradability, and environmental durability, the discovery of such a suitable composite material has remained an unsolved problem in the state of the art.

SUMMARY OF THE INVENTION

In one aspect, the invention provides a composite material that includes a matrix composed of a polyhydroxyalkanoate (PHA) polymer, such as Poly(B-hydroxybutyrate)-co-poly (B-hydroxyvalerate) (PHBV), and a filler composed of particles dispersed in the matrix. The particles are composed of naturally-derived materials, have a microporous microstructure, have a hygroscopic expansion of at most 2%, and have diameters within the range 0.1 mm to 1.0 mm. For example, the particles may be ground bone meal or pumice. Preferably, the matrix and the filler together constitute at least 99% by weight of the composite material. The filler preferably consumes at most 30% by volume of the composite material, and more preferably the filler consumes between 15% and 25% by volume of the composite material. The composite material is preferably biodegradable. The composite material may take the form of an article of manufacture such as a building material. The composite material may also take the form of a coating on a building material or other article.

DETAILED DESCRIPTION

Throughout the present description and claims, the following terminology will be used.

A naturally-derived material is defined to be a material that may be prepared from biological or geological natural resource materials solely by mechanical processing (e.g., grinding or pressing) that involves no chemical, additive, or substance other than potable water and/or processing for purposes of separation, isolation, or purification.

A biodegradable material is defined to be a material that experiences chemical dissolution through the action of microorganisms in less than ten years, or more preferably, less than one year.

A microporous material is defined as a material containing pores with diameters less than 2 nm.

The hygroscopic expansion of a material is defined as the fractional amount of linear expansion the material experiences as a result of its being saturated by moisture from its environment.

Conventional plastic composites often use filler materials such as natural fibers in the plastic matrix to increase stiffness and reduce cost. However, due to their inherent hydrophilicity and high coefficients of hygroexpansion, natural fibers tend to absorb moisture and expand when exposed to environmental moisture, damaging the composite material. Consequently, because of these durability problems, the use of fillers in plastic composites has generally discouraged consideration of such composites for use as building materials.

Moreover, although bioplastics such as PHBV are hydrophobic, prolonged exposure to moisture may initiate hydrolytic attack of polymer chains and lead to subsequent degradation of mechanical properties. Consequently, because they are sensitive to moisture, bioplastics such as PHBV previously have not been seriously considered suitable as a durable matrix material for long-term building applications.

Surprisingly, however, despite the above problems, the present inventors have discovered bioplastic composite materials that have improved durability and service life when exposed to environmental moisture, while also having mechanical properties suitable for use as building materials.

Figure 1A:
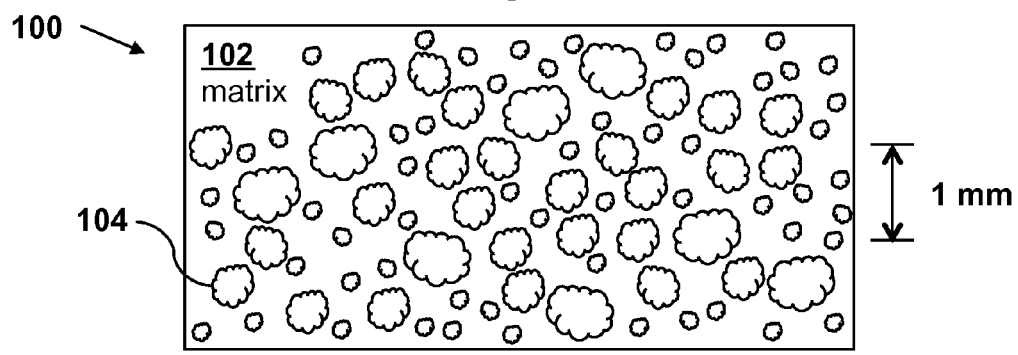
FIG. 1A is a cross-sectional diagram of a composite material according to an embodiment of the present invention.
Figure 1B:
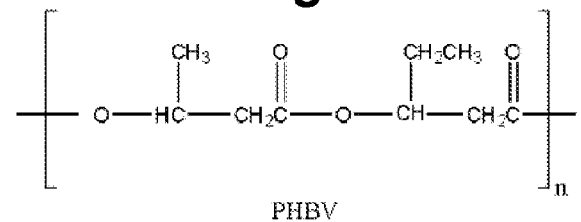
FIG. 1B shows the chemical structure of PHBV, a naturally occurring biopolymer used as a matrix in a composite material according to an embodiment of the present invention.

As shown in the cross-sectional diagram of FIG. 1A, a composite material 100 according to an embodiment of the present invention is composed of a particulate filler 104 made of naturally-derived particles dispersed in a matrix 102 made of a PHA polymer such as a PHBV. PHBV, shown in FIG. 1B, is a naturally occurring polymer that is biosynthesized from microbes that store PHBV as an energy reserve under nutrient-deficient conditions. This biopolymer is biodegradable in any anaerobic environment (e.g., in an anaerobic landfill), but does not easily biodegrade in oxygenated environments. PHBV has similar mechanical properties as the conventional plastic polypropylene. In contrast to petroleum-derived commercial plastics used to construct fiber-reinforced polymer composites (polypropylene, polystyrene, polyester, etc.), PHBV is a natural, bio-based polymer that is completely biodegradable.

To increase the durability of the bioplastic composite, and in particular its resistance to the effects of environmental humidity, the inventors have discovered a class of bioplastic composites. Specifically, the composites of the present invention are composed of a PHA bioplastic matrix with particles dispersed in the matrix, where the particles have very low coefficients of hygroexpansion and have a microporous microstructure to provide preferential moisture absorption paths in high humidity environments. These properties increase the desired durability of the composite as compared to conventional plastic composites. Preferably, the filler particles are naturally-derived and biodegradable, enhancing the environmental qualities of the composite.

In preferred embodiments of the invention, the particulate filler is made of either ground bone meal, powdered pumice, or a mixture of the two. Ground bone meal is an industrial byproduct of the food industry which is largely disposed as waste. Ground pumice is a lightweight, naturally occurring aggregate. These filler materials have various advantageous features. Tensile tests of the PHBV-bone meal composite reveal that bone meal filler makes the composite stiffer than the pure PHBV. Moreover, data revealed that the moisture absorption rate in bone meal composites was twice that of pure PHBV. As a result, these fillers avoid the adverse effects of exposure to environmental moisture that damage composites using natural fibers. Bone meal is also relatively inexpensive, low density, and is naturally-derived.

In other embodiments, the filler may be composed of other naturally-derived materials that have a low hygroexpansion coefficients and also exhibit a preferential moisture absorption. For example, in some embodiments, the filler is composed of nanoclays or other porous geomaterials, or lightweight materials such as chicken feathers. The selection of the filler is largely driven by cost considerations, processability of the bio-based composites using these materials, and end use requirements.

Figure 2B:
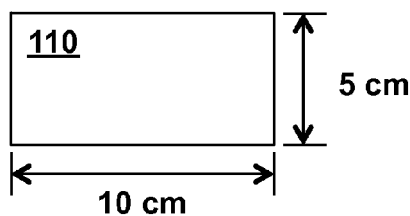
FIG. 2B shows a cross-sectional view of the composite material of FIG. 2A.
Figure 2A:
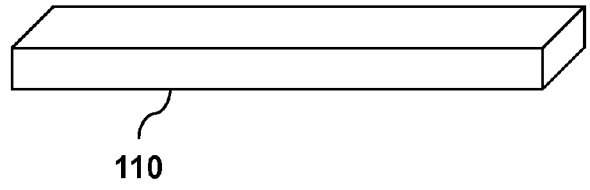
FIG. 2A is an isometric view of a structural building article made of a composite material according to an embodiment of the present invention.

The biocomposite materials of the present invention may be used to create structural materials (e.g., articles for use in building construction), non-structural materials (e.g., articles for use in furniture), building trim materials, building siding materials, and absorptive coatings for other bio-based composite materials. For example, FIG. 2A is an isometric view of a structural building article 110 which consists of a solid volume of a composite material of the present invention. FIG. 2B shows the same piece of composite material 110 in cross-sectional view.

Figure 3B:
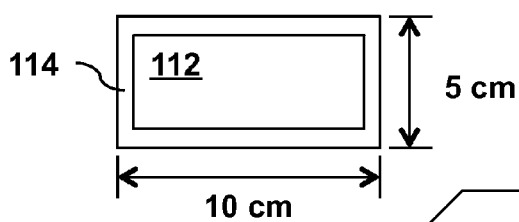
FIG. 3B is a cross-sectional view of the article shown in FIG. 3A according to an embodiment of the present invention.
Figure 3A:
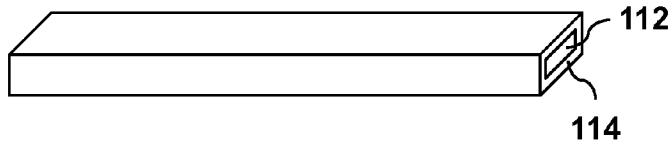
FIG. 3A is an isometric view of a building article according to an embodiment of the present invention, where the article is composed of a composite structural material coated on its exterior surfaces with a layer of the composite material of the present invention.

The composite material of the present invention may also be used as a coating applied to a building article or other material. Preferably, the coated material is itself a biodegradable composite material. For example, FIG. 3A is an isometric view of a building article similar to that shown in FIG. 2A. The building article of FIG. 3A is composed of a composite structural material 112 coated on its exterior surfaces with a layer of the composite material 114. FIG. 3B is a cross-sectional view of the same coated article. The thickness of the coating 114 may be chosen based on the end use application of the building article. For many applications, a suitable thickness is at most 5 mm.

This composite coating has several advantages over conventional, environmentally insensitive coatings (varnishes) that are typically used to inhibit moisture absorption. Such conventional coatings have high levels of volatile organic compounds, which have undesirable environmental effects. In contrast, the biocomposite material coatings of the present invention avoid the detrimental environmental effects of conventional moisture sealants, serve as a moisture reservoir coating to protect the underlying structural material, and do not affect the biodegradability of the underlying material. Moreover, after absorption of moisture in a humid environment, the composite material may later serve as a humidifier in dry environments.

A structural bio-based composite such as shown in FIGS. 2A and 2B may be manufactured via single- or twin-screw extrusion, combining a PHBV melt with ground bone meal and/or powdered pumice.

The bone meal may be obtained by crushing animal bones, such as those of cattle or chickens, after they are boiled in water, cleaned, and dried to remove organic matter. Such a process is considered to lie within the scope of the definition of naturally derived material. A sieve may be used to select bone meal particles of desired size. Preferably, the particle sizes are in the range from 0.1 mm to 1.0 mm.

After selection of particles in the desired size range, the particles may be purified to remove any residual organic remnants left from the bone meal manufacturing process. It may be desirable to remove such organic material from the bone meal if it is present in sufficiently large degree that its thermal degradation in the extruder will cause large voids within the resulting composite material. Such purification may be performed in various ways including, for example, exposing it to chloroform on a 140° C. hot plate for one hour. The bone meal is then oven-dried overnight at 66° C. to remove moisture. In most cases, however, such purification is not necessary and does not significantly improve composite performance.

PHBV pellets are mixed with measured amounts of bone meal in a 10:1 ratio by weight of PHBV to bone meal. The ratio of PHBV to bone meal is preferably selected so that the filler consumes 15% to 25% by volume of the resulting composite material, but in any case no more than 30%. Preferably, the PHBV and the filler together constitute at least 99% by weight of the resulting composite material. The PHBV pellets, for example, may contain some processing additives. In some embodiments, however, no other materials except for the polymer and filler are used to form the composite.

The uniform mixture of PHBV pellets and bone meal filler are gradually and simultaneously fed to an extruder, which melts the polymer at temperatures of 150° C. to form a matrix with the filler dispersed within it. The extruder is equipped with a rod dye in order to extrude rods of composite. After cooling, the rods are pelletized and re-extruded into thin strips. This two-phase extrusion process is designed to thoroughly mix the PHBV and bone meal and to ensure a uniform distribution of filler material in the resulting composite.

Next, the strips are stacked and placed between aluminum plates, and hot pressed together. Hot pressing at 180° C. for 1 minute and 10 seconds under 48 kPa is preferred in order to minimize air-bubbles and to maximize thickness of the composite plate. The process may be repeated as desired to produce a composite material having desired size.

At the end of their service life, bio-based composites are expected to decompose faster in anaerobic environments than conventional construction materials, such as wood and polypropylene-based plastics. As an added benefit, the methane released by bio-based composites can by captured and fed to PHB-producing microbes. The PHB can then be copolymerized to make PHBV, making composite production self-sustaining It is also possible to use methods of biosynthesis such that the microbes directly produce PHBV.

Laboratory tests of the PHBV-bone meal composite material show that it has an 18% higher stiffness and comparable yield strength when compared to the pure PHBV. Furthermore, the bone meal composites differed from the PHBV in that they exhibited little plastic behavior, demonstrating that the material becomes brittle with the addition of the bone meal filler.

In order to evaluate whether the composite material's mechanical behavior can be adequately described by the Rule of Mixtures, the composite's theoretical elastic modulus $E_c$ may be computed and compared to the experimental value. Laboratory tests have shown that theoretical elastic modulus for the composite material, $E_c$, calculated from the rule of mixtures overestimates the experimentally derived elastic modulus by 34.6%. This overestimation shows that the bone meal composite cannot be accurately described by this model with the data at hand. One possible reason for the discrepancies between the theoretical and experimental model is that the density of chicken bone varies significantly depending on the age of the chicken. Different values for density yield different results for $E_c$. Another possible reason is weak interfacial bond between the polymer and bone particles. However, because the theoretical value lies within one standard deviation of the experimentally derived elastic modulus, it can be concluded that the composite behaves like large-particle composite materials.

Measurements of moisture absorption as a function of $\sqrt{t}$ for the bone meal composite verify that, in accordance with the Fickian diffusion model, moisture absorption ($M_t$) of the bone meal composite increases linearly with $\sqrt{t}$. The water absorption rate for bone-meal composites is more than twice that of pure PHBV. Low moisture uptake for the pure PHBV specimens is expected because of the hydrophobic nature of PHBV. Higher moisture content for the bone meal composites may be due to the weak interfacial adhesion between the coarse bone meal particles and the polymer matrix. Gaps between the polymer and bone meal may allow water to travel through the material at a faster rate. The hot-pressing methods used to manufacture these specimens do not ensure a polymer surface coating around the composite; therefore, voids between the matrix and bone meal particles may exist on the surface of each specimen. These voids may provide pathways through which water molecules may enter, and thus increase the degree of moisture absorption. Despite this absorption, however, the material does not significantly swell upon absorbing moisture, thereby overcoming the main durability problem in conventional composites. Measurements of thickness swelling behavior for the bone meal composite show only a slight increase in swelling within the first 500 minutes, followed by a gradual increase in thickness after this initial immersion period. The overall expansion upon uptake of moisture is sufficiently small (less than 2%) that it does not significantly affect durability.

The manufacturing process described above is just one possible process. Those skilled in the art will appreciate that, in light of the guidance and teachings of the present description, various other techniques and processes may be used to produce composite materials of the present invention. For example, injection molding techniques may be used and could both ensure a more uniform mix between the PHBV and bone meal filler, and also eliminate air bubbles. Furthermore, the polymer surface layer that injection provides may reduce the rate at which the composites absorb water. With a polymer coating surrounding the composite material, there would be fewer voids along the surface of the composite, reducing water infiltration.

The invention claimed is:

1. A composite material comprising:
   a) a matrix composed of a polyhydroxyalkanoate (PHA) polymer; and
   b) a filler composed of particles dispersed in the matrix;
   wherein the particles have diameters within the range 0.1 mm to 1.0 mm;
   wherein the particles are composed of ground bone meal.

2. The composite material of claim 1 wherein the matrix and the filler together constitute at least 99% by weight of the composite material.

3. The composite material of claim 1 wherein the filler consumes at most 30% by volume of the composite material.

4. The composite material of claim 1 wherein the filler consumes between 15% and 25% by volume of the composite material.

5. The composite material of claim 1 wherein the composite material is biodegradable.

6. The composite material of claim 1 wherein the PHA is Poly (B-hydroxybutyrate)-co-poly(B-hydroxyvalerate).

* * * * *

UNITED STATES PATENT AND TRADEMARK OFFICE
CERTIFICATE OF CORRECTION

PATENT NO. : 8,507,588 B2
APPLICATION NO. : 13/367900
DATED : August 13, 2013
INVENTOR(S) : Wilfred V. Srubar, III It is certified that error appears in the above-identified patent and that said Letters Patent is hereby corrected as shown below:

In the Specification

Col. 1, line 5, the Statement of Government Sponsored Research should be corrected to read as follows:

This invention was made with Government support under contract 0900325 awarded by the National Science Foundation. The Government has certain rights in this invention.

Signed and Sealed this
Fourth Day of March, 2014

Michelle K. Lee
*Deputy Director of the United States Patent and Trademark Office*